United States Patent [19]

Auxier et al.

[11] Patent Number: 4,676,719

[45] Date of Patent: Jun. 30, 1987

[54] FILM COOLANT PASSAGES FOR CAST HOLLOW AIRFOILS

[75] Inventors: Thomas A. Auxier, Lake Park; Robert E. Field, Tequesta, both of Fla.

[73] Assignee: United Technologies Corporation, Hartford, Conn.

[21] Appl. No.: 812,101

[22] Filed: Dec. 23, 1985

[51] Int. Cl.⁴ ............................................. F01D 5/18
[52] U.S. Cl. .................... 416/97 R; 415/115
[58] Field of Search .................. 416/97 R, 97 A; 415/115; 60/757

[56] References Cited

U.S. PATENT DOCUMENTS

| | | | |
|---|---|---|---|
| 1,857,509 | 5/1932 | Holmstrom . | |
| 2,149,510 | 3/1939 | Darrieus | 60/41 |
| 2,220,420 | 11/1940 | Meyer | 60/41 |
| 2,236,426 | 3/1941 | Faber | 60/41 |
| 2,477,583 | 8/1949 | De Zubay et al. | 60/44 |
| 2,489,683 | 11/1949 | Stalker | 60/41 |
| 3,098,148 | 7/1963 | Piot et al. | 219/69 |
| 3,303,645 | 2/1967 | Ishibashi | 60/39.65 |
| 3,447,318 | 6/1969 | Carvel et al. | 60/39.65 |
| 3,515,499 | 6/1970 | Beer et al. | 416/95 |
| 3,527,543 | 9/1970 | Howald | 416/90 |
| 3,594,536 | 7/1971 | Holroyd | 219/69 |
| 3,619,076 | 11/1971 | Kydd | 416/90 |
| 3,635,586 | 1/1972 | Keat et al. | 416/97 |
| 3,746,827 | 7/1973 | Martin et al. | 219/69 |
| 3,778,183 | 12/1973 | Luscher et al. | 415/115 |
| 3,799,696 | 3/1974 | Redman | 416/97 |
| 3,801,218 | 4/1974 | Moore | 416/97 A |
| 3,830,450 | 8/1974 | Williams et al. | 244/42 |
| 3,844,677 | 10/1974 | Evans | 416/84 |
| 3,889,903 | 6/1975 | Hilby | 244/42 |
| 3,915,106 | 10/1975 | De Witt | 114/66.5 |
| 3,995,422 | 12/1976 | Stamm | 60/39.66 |
| 4,142,824 | 3/1979 | Andersen | 415/115 |
| 4,162,136 | 7/1979 | Parkes | 416/97 |
| 4,168,938 | 9/1979 | Dodd | 416/97 |
| 4,197,443 | 4/1980 | Sidenstick | 219/69 |
| 4,214,722 | 7/1980 | Tamura | 244/208 |
| 4,267,698 | 5/1981 | Hartmann et al. | 60/756 |
| 4,270,883 | 6/1981 | Corrigan | 415/115 |
| 4,303,374 | 12/1981 | Braddy | 416/97 |
| 4,314,442 | 2/1982 | Rice | 60/39.05 |
| 4,384,823 | 5/1983 | Graham | 416/1 |

FOREIGN PATENT DOCUMENTS

| | | | |
|---|---|---|---|
| 599697 | 6/1960 | Canada | 415/115 |
| 55-114806 | 9/1980 | Japan . | |
| 665155 | 1/1952 | United Kingdom . | |
| 2066372 | 7/1981 | United Kingdom | 416/97 R |

OTHER PUBLICATIONS

Flight and Aircraft Engineer, No. 2460, vol. 69, 3-1-6-56, pp. 292-295.

Advances in Heat Transfer by Richard J. Goldstein, vol. 7, Academic Press (N.Y.) 1971 The Monograph Film Cooling, pp. 321-379.

NASA Technical Paper 1546 Influence of Coolant Tube Curvature on Film Cooling Effectiveness as Detected by Infrared Imagery by S. Stephen Papell et al, 1979.

*Primary Examiner*—Everette A. Howell, Jr.
*Attorney, Agent, or Firm*—Stephen E. Revis

[57] ABSTRACT

The external wall of a hollow airfoil for a gas turbine engine has a plurality of longitudinally aligned diffusing coolant passages having their outlets at the outer surface over which a hot gas is intended to flow. The airfoil external wall also includes a longitudinally extending slot formed in the inner surface thereof. Each of the coolant passages intersect such longitudinally extending slot to define metering inlets to each passage for receiving coolant fluid from the slot at a controlled rate. The coolant diffuses as it passes through each passage and exits as a thin film on the external surface of the airfoil. The slot is cast in the inner surface of the wall at the time of forming the airfoil; and the passages are machined into the wall from outside the airfoil. Very small, accurate metering areas for each passage can thereby be formed in single-piece hollow airfoils without access to the interior of the airfoil.

11 Claims, 16 Drawing Figures

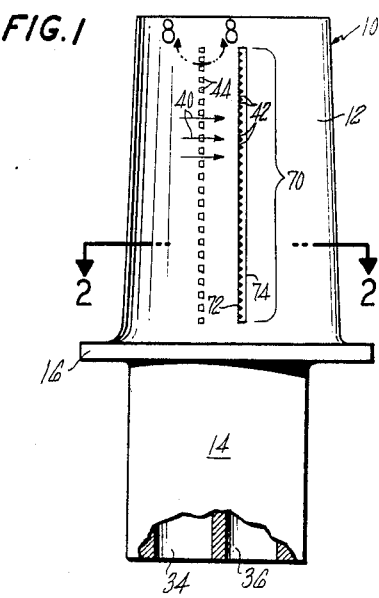
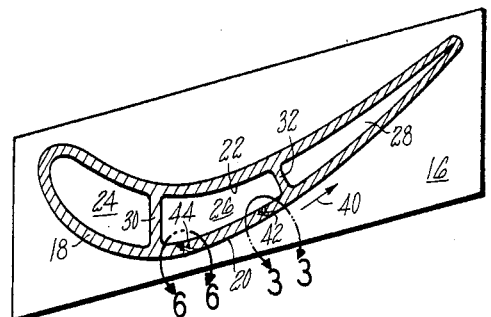
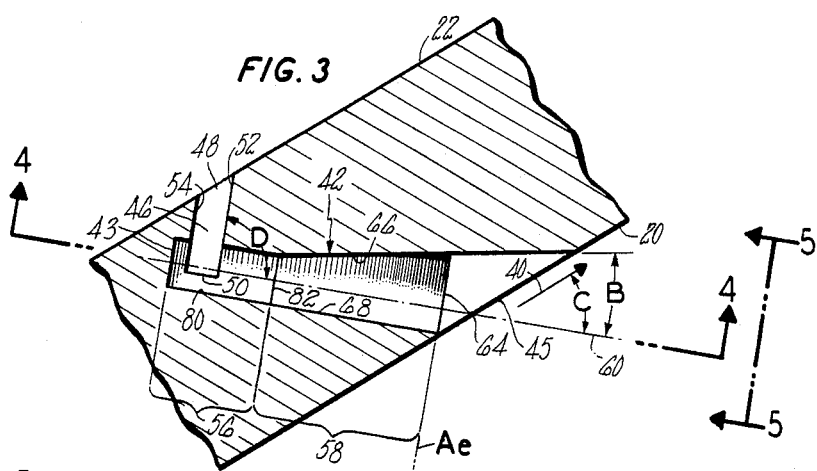
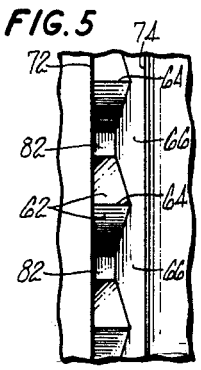
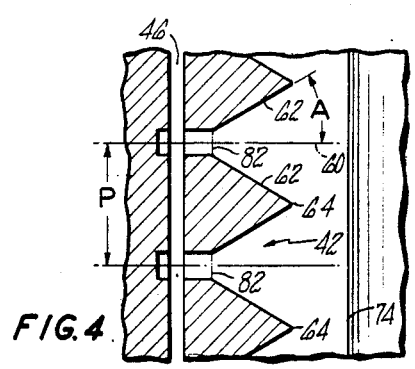

FIG. 15 PRIOR ART
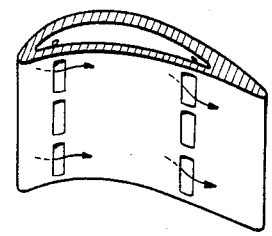
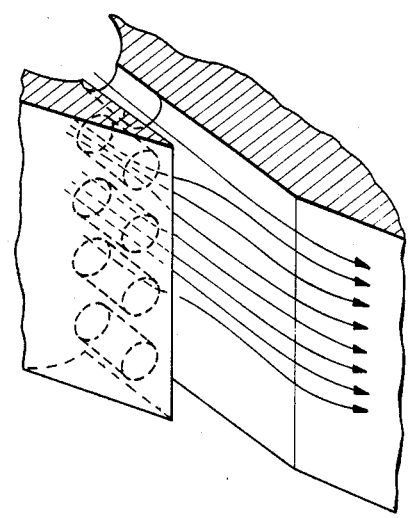
FIG. 16 PRIOR ART

FILM COOLANT PASSAGES FOR CAST HOLLOW AIRFOILS

The government has rights in this invention pursuant to Contract No. N00140-83-C-8897 awarded by the Department of the Navy.

DESCRIPTION

1. Technical Field

This invention relates to film cooling, and more particularly to film cooled airfoils.

2. Background Art

It is well known the external surface of airfoils may be cooled by conducting cooling air from an internal cavity to the external surface via a plurality of small passages. It is desired that the air exiting the passages remain entrained in the boundary layer on the surface of the airfoil for as long a distance as possible downstream of the passage to provide a protective film of cool air between the hot mainstream gas and the airfoil surface. The angle which the axis of the passage makes with the airfoil surface and its relation to the direction of hot gas flow over the airfoil surface at the passage breakout are important factors which influence film cooling effectiveness. Film cooling effectiveness E is defined as the difference between the temperature of the main gas stream ($T_g$) and the temperature of the coolant film ($T_f$) at a distance x downstream of the passage outlet, divided by the temperature difference between the temperature of the main gas stream and the coolant temperature ($T_c$) at the passage outlet (i.e., at $x=0$) thus, $E=(T_g-T_f)/(T_g-T_c)$. Film cooling effectiveness decreases rapidly with distance x from the passage outlet. Maintaining high film cooling effectiveness for as long a distance as possible over as large a surface area as possible is the main goal of airfoil film cooling.

It is well known in the art, that the engine airfoils must be cooled using a minimum amount of cooling air, since the cooling air is working fluid which has been extracted from the compressor and its loss from the gas flow path rapidly reduces engine efficiency. Airfoil designers are faced with the problem of cooling all the engine airfoils using a specified, maximum cooling fluid flow rate. The amount of fluid which flows through each individual cooling passage from an internal cavity into the gas path is controlled by the minimum cross-sectional area (metering area) of the cooling passage. The metering area is typically located where the passage intersects the internal cavity. The total of the metering areas for all the cooling passages and orifices leading from the airfoil controls the total flow rate of coolant from the airfoil, assuming internal and external pressure fields are predetermined and generally not controllable by the designer. The designer has the job of specifying the passage size and the spacing between passages, as well as the shape and orientation of the passages, such that all areas of the airfoil are maintained below critical design temperature limits determined by the airfoil material capability, maximum stress, and life requirement considerations.

Ideally, it is desired to bathe 100% of the airfoil surface with a film of cooling air; however, the air leaving the passage exit generally forms a cooling film stripe no wider than or hardly wider than the dimension of the passage exit perpendicular to the gas flow. Limitations on the number, size, and spacing of cooling passages results in gaps in the protective film and/or areas of low film cooling effectiveness which may produce localized hot spots. Airfoil hot spots are one factor which limits the operating temperature of the engine.

U.S. Pat. No. 3,527,543 to Howald uses divergently tapered passages of circular cross section to increase the entrainment of coolant in the boundary layer from a given passage. The passages are also preferably oriented in a plane extending in the longitudinal direction or partially toward the gas flow direction to spread the coolant longitudinally upon its exit from the passage as it moves downstream. Despite these features, it has been determined by smoke flow visualization tests and engine hardware inspection that the longitudinal width of the coolant film from an elliptical passage breakout (i.e. Howald) continues to expand longitudinally only about a maximum of one passage exit minor diameter after the coolant is ejected on the airfoil surface. This fact, coupled with typical longitudinal spacing of three to six diameters between passages, result in areas of airfoil surface between and downstream of longitudinally spaced passages which receive no cooling fluid from that row of passages. Conical, angled passages as described in Howald U.S. Pat. No. 3,527,543 provide at best probably no more than 70% coverage (percentage of the distance between the centers of adjacent hole breakouts which is covered by coolant).

The velocity of the air leaving the cooling passage is dependent on the ratio of its pressure at the passage inlet to the pressure of the gas stream at the passage outlet. In general the higher the pressure ratio, the higher the exit velocity. Too high an exit velocity results in the cooling air penetrating into the gas stream and being carried away without providing effective film cooling. Too low a pressure ratio will result in gas stream ingestion into the cooling passage causing a complete loss of local airfoil cooling. Total loss of airfoil cooling usually has disastrous results, and because of this a margin of safety is usually maintained. This extra pressure for the safety margin drives the design toward the higher pressure ratios. Tolerance of high pressure ratios is a desirable feature of film cooling designs. Diffusion of the cooling air flow by tapering the passage, as in the Howald patent discussed above is beneficial in providing this tolerance, but the narrow diffusion angles taught therein (12° maximum included angle) require long passages and, therefore, thick airfoil walls to obtain the reductions in exit velocities often deemed most desirable to reduce the sensitivity of the film cooling design to pressure ratio. The same limitation exists with respect to the trapezoidally shaped diffusion passages described in Sidenstick, U.S. Pat. No. 4,197,443. The maximum included diffusion angles taught therein in two mutually perpendicular planes are 7° and 14°, respectively, in order to assure that separation of the cooling fluid from the tapered walls does not occur and the cooling fluid entirely fills the passage as it exits into the hot gas stream. With such limits on the diffusing angles, only thicker airfoil walls and angling of the passages in the airfoil spanwise direction can produce wider passage outlets and smaller gaps between passages in the longitudinal direction. Wide diffusion angles would be preferred instead, but cannot be achieved using prior art teachings.

Japanese Pat. No. 55-114806 shows, in its FIGS. 2 and 3 (reproduced herein as prior art FIGS. 15 and 16), a hollow airfoil having straight cylindrical passages disposed in a longitudinal row and emptying into a longitudinally extending slot formed in the external surface of the airfoil. While that patent appears to teach that the flow of cooling fluid from adjacent passages blends to form a film of cooling fluid of uniform thickness over the full length of the slot by the time the cooling fluid exits the slot and reaches the airfoil surface, our test experience indicates that the coolant fluid from the cylindrical passages moves downstream as a stripe of essentially constant width, which is substantially the diameter of the passage. Any diffusion which results in blending of adjacent stripes of coolant fluid occurs so far downstream that film cooling effectiveness at that point is well below what is required for most airfoil designs.

U.S. Pat. No. 3,515,499 to Beer et al describes an airfoil made from a stack of etched wafers. The finished airfoil includes several areas having a plurality of longitudinally spaced apart passages leading from an internal cavity to a common, longitudinally extending slot from which the cooling air is said to issue to form a film of cooling air over the airfoil external surface. In FIG. 1 thereof each passage appears to converge from its inlet to a minimum cross-sectional area where it intersects the slot. In the alternate embodiment of FIG. 9, the passage appears to have a small, constant size which exits into a considerably wider slot. Both configurations are likely to have the same drawbacks as discussed with respect to the Japanese patent; that is, the cooling fluid will not uniformly fill the slot before it enters the main gas stream, and considerably less than 100% film coverage downstream of the slot is likely.

Other publications relating to film cooling the external surface of an airfoil are: U.S. Pat. Nos. 2,149,510; 2,220,420; 2,489,683; and "Flight and Aircraft Engineer" No. 2460, Vol. 69, 3/16/56, pp. 292-295, all of which show the use of longitudinally extending slots for cooling either the leading edge or pressure and suction side airfoil surfaces. The slots shown therein extend completely through the airfoil wall to communicate directly with an internal cavity. Such slots are undesireable from a structural strength viewpoint; and they also require exceedingly large flow rates.

U.S. Pat. No. 4,303,374 shows a configuration for cooling the exposed, cut-back surface of the trailing edge of an airfoil. The configuration includes a plurality of longitudinally spaced apart, diverging passages within the trailing edge. Adjacent passages meet at their outlet ends to form a continuous film of cooling air over the cut-back surface.

A serial publication, "Advances in Heat Transfer" edited by T. F. Irvine, Jr. and J. P. Hartnett, Vol. 7, Academic Press (N.Y. 1971) includes a monograph titled *Film Cooling*, by Richard J. Goldstein, at pp. 321-379, which presents a survey of the art of film cooling. The survey shows elongated slots of different shapes extending entirely through the wall being cooled, and also passages of circular cross section extending through the wall.

DISCLOSURE OF INVENTION

One object of the present invention is an improved film cooling passage configuration for cooling a wall over which a hot gas stream is flowing.

Another object of the present invention is a hollow airfoil having an improved film cooling passage configuration for film cooling the external surface of the airfoil.

Yet another object of the present invention is a method for manufacturing film cooling passages in a single piece hollow airfoil.

According to the present invention, in a wall to be cooled a plurality of longitudinally aligned diffusing coolant passages have their outlets at an outer surface over which a hot gas is intended to flow, the passages intersecting a longitudinally extending slot formed in the inner surface of the wall to be cooled to define metering inlets to the passages for receiving coolant fluid from the slot at a controlled rate.

In accordance with one embodiment of the present invention, the wall to be cooled is the external wall of a cast, hollow, longitudinally extending airfoil, wherein a longitudinally extending slot is formed in the internal surface of the wall at the time of casting the airfoil. Coolant passages are then machined into the wall from outside the airfoil and intersect a side wall of the slot to form the inlets of the passages. Each passage is oriented to direct the flow of coolant therefrom in the general direction of flow of hot gas over the outer airfoil surface and at a shallow angle to the outer airfoil surface to form a continuous film of coolant over the surface along the longitudinal length of the outlet. The passages may be machined by any suitable means, such as by electrodischarge machining (EDM). Each passage includes a straight section at its inlet end having a constant cross-section, followed by a diffusing section including side surfaces which diverge from each other in a longitudinal plane to an outlet at the outer surface of the wall. Preferably adjacent passages are sufficiently close to each other such that their diverging side surfaces intersect each other below the outer surface of the wall being cooled, whereby the plurality of passages define a common outlet at the external surface which is a longitudinally extending slot.

In the prior art, such as shown in hereinabove mentioned U.S. Pat. Nos. 3,527,543 and 4,197,443 the coolant passages extend along a central axis entirely through the wall being cooled to form an inlet at the internal surface thereof. The coolant fluid enters the passage inlet and travels toward the outlet in the direction of the central axis, and tends to flow as a relatively cohesive, unidirectional mass which is difficult to spread into an expanding passage with widely diverging surfaces. Thus, void areas form within the passage. It is believed the foregoing problem is the result of the bulk of the coolant fluid entering the inlets of these passages with a velocity and momentum substantially parallel to the central axis of the passage.

In the present invention a first portion of each passage, having a constant cross section, intersects the side wall of a narrow slot formed in the internal surface of the wall. The passage itself does not extend completely through the wall. Preferably the passage intersects the slot sidewall at a sharp angle, most preferably 90°. Thus, in order for the coolant fluid to enter the passage it must first flow into the narrow slot in a direction substantially perpendicular to or at least suddenly angled relative to the centerline of the passage. The fluid must then suddenly change direction to enter the passage; and turbulence is created at the base of the slot by fluid striking the passage wall at a sharp angle. It is believed that this turbulence and change in direction of the fluid as it enters the passage reduces the cohesiveness of the fluid as it moves into the first portion of the passage by causing a significant portion of the fluid particles to have a substantial component of velocity perpendicular to the central axis of the passage. This lack of cohesiveness and lack of common direction of the fluid particles permits them to more readily spread out within the second portion or diffusing section of the passage. Therefore, the diffusing section can have more widely diverging surfaces and thereby spread the coolant fluid over a larger surface area of the external surface of the wall to be cooled. Passages in accordance with the present invention have been successfully tested with side surfaces diverging from each other at an angle of 60° (included angle).

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a hollow turbine blade, partly broken away, which incorporates the features of the present invention.

FIG. 2 is a sectional view taken along the line 2—2 of FIG. 1.

FIG. 3 is an enlarged view of the area 3—3 of FIG. 2 showing a cooling passage configured according to the present invention.

FIG. 4 is a cross-sectional view taken along the line 4—4 of FIG. 3.

FIG. 5 is a view taken generally along the line 5—5 of FIG. 3.

FIGS. 15 and 16 are reproductions of FIGS. 2 and 3, respectively, of prior art Japanese Pat. No. 55-114806.

BEST MODE FOR CARRYING OUT THE INVENTION

Figure 6:
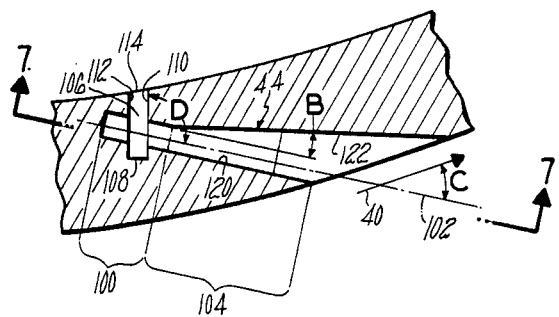
FIG. 6 is an enlarged view of the area 6—6 of FIG. 2 showing an alternate embodiment of a coolant passage configuration according to the present invention.

As an exemplary embodiment of the present invention, consider the turbine blade of FIG. 1 generally represented by the reference numeral 10. With reference to FIGS. 1 and 2, the blade 10 comprises a one piece, cast hollow airfoil 12 which extends in a spanwise or longitudinal direction from a root 14 which is integral therewith. A platform 16 is disposed at the base of the airfoil 12. The airfoil 12 comprises a wall 18 having an outer surface 20 and an inner surface 22. The inner surface 22 defines a longitudinally extending internal cavity which is divided into a plurality of adjacent longitudinally extending compartments 24, 26, 28, respectively, by longitudinally extending ribs 30, 32. The passage 34 within the root 14 communicates with the compartment 24; and the passage 36 communicates with the compartments 26 and 28. When the blade 10 is operated in its intended environment, such as in the turbine section of a gas turbine engine, coolant from a suitable source, such as compressor bleed air, is fed into the passages 34, 36 and pressurizes the compartments 24, 26, and 28.

Throughout the drawing the arrows 40 represent the direction of flow (i.e., streamlines) of hot gases over the surface of the airfoil. For purposes of the description of the present invention, the direction of flow of hot gases over either the pressure or suction side surfaces of the airfoil shall be considered the downstream direction. Thus, at any point on the suction or pressure side surface of the airfoil, the downstream direction is tangent to the surface of the airfoil at that point; and, except perhaps close to the airfoil tip or the airfoil base gear the platform 16 where atypical currents are generated, the downstream direction is substantially perpendicular to the spanwise direction of the airfoil.

In accordance with the present invention, the pressurized coolant fluid within the compartments 24, 26, 28 cools the airfoil external wall 18 by exiting the airfoil via passages through the wall 18, such as the passages 42, 44, which will hereinafter be described in further detail. In a typical turbine blade airfoil there may be many rows of passages, such as the passages 44, or passages of other shapes, which passages would be located on both the pressure and suction side of the airfoil and also around the leading edge of the airfoil. For purposes of clarity and simplification, only two rows of passages are shown in the drawing. Thus, the airfoil in the drawing is intended to be illustrative only and not limiting.

As best shown in FIGS. 3-5 the airfoil 10 includes a plurality of coolant passages 42 aligned in a longitudinally (spanwise) extending row. Each of the passages 42 intersect a longitudinally extending slot 46 formed in the internal surface 22 of the wall. The slot 46 includes an inlet 48, a base 50, and a pair of closely spaced apart, parallel side surfaces 52, 54. Each coolant passage 42 includes a straight section 56 having a constant cross section along its length (rectangular in this embodiment), and a diffusing section 58 in series flow relation thereto. A central axis 60 of each passage 42, which in this embodiment is perpendicular to the longitudinal direction, passes through the geometric center of the cross-sectional area of the straight section 56.

Each passage 42 extends from its base or closed end 43 within the wall 18 to an outlet 45 at its other end at the surface 20 of the airfoil. Each diffusion section 58 includes a pair of facing, spaced apart end surfaces 62, each of which diverges toward the surface 20, in a longitudinal plane, from the central axis 60 by an angle A, and from each other by an included angle of twice A. The included angle is preferably at least 30° and has been tested successfully up to 56°. The end surfaces 62 of adjacent passages 42 intersect each other at about the external surface 20, as at 64. Each diverging section 58 also includes a pair of spaced apart, facing side surfaces 66, 68 which interconnect the end surfaces 62 to form the diffusing section 58. The surfaces 66, 68 extend from the straight section 56 of their respective passage to intersect with the external surface 20 of the airfoil and define a longitudinally extending slot 70. The surfaces 68 form the upstream edge 72 of the slot, and the surfaces 66 form the downstream edge 74 of the slot. For this reason, the surfaces 66 are referred to as the downstream surfaces of the diffusing sections and the surfaces 68 are referred to as the upstream surfaces of the diffusing sections.

In this preferred embodiment the upstream surface 68 is parallel to the central axis 60, while the downstream surface 66 diverges from the surface 68 and from the central axis 60 by an angle B, which is preferably between 5 and 10°. The central axis 60 preferably forms a shallow angle C with the downstream direction 40 of no greater than about 40° (most preferably 30° or less) which angle is essentially the same as is formed between the central axis 60 and the external surface 20 at the passage outlet. This minimizes penetration of the coolant stream into the hot gas stream in a direction perpendicular to the outer surface of the airfoil. Excessive penetration can result in the coolant being immediately swept away from the surface of the airfoil rather than forming a coolant film entrained in the boundary layer of the airfoil surface downstream of the slot 70.

Figure 9:
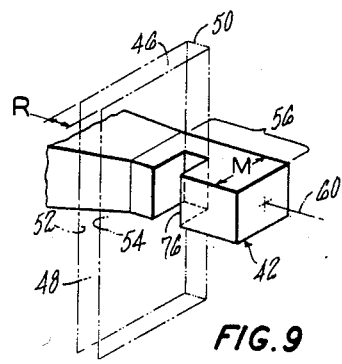
FIG. 9 is an illustrative perspective view of the area of intersection of two component portions of the coolant passage according to one embodiment of the present invention.

Referring to FIGS. 1-5, the straight section 56 of each passage 42 intersects the side surface 52 and the base 50 of the slot 46 to define an inlet for the coolant fluid to enter each passage 42. In this embodiment the central axis 60 is perpendicular to the plane of the side surface 52. Preferably the angle D is between 60 and 120°. The perspective view of FIG. 9 is illustrative of the area of intersection between a passage 42 and the slot 46. The inlet to the passage 42 which is formed at the intersection is herein designated by the reference numeral 76, and is the passage metering area since it is smaller than the cross-sectional area of the straight section 56 perpendicular to the central axis 60. Of course, for the passage inlet 76 to be small enough to be a metering area for the passage 42 the width R of the slot 48 would have to be considerably smaller than the width M of the straight section 56. How much smaller would depend upon how much of the width M of the straight section 56 is intersected by the slot 46.

The configuration of FIG. 9 may be used advantageously to provide very small metering areas without the need to form metering passages with exceedingly small diameters, which are difficult to fabricate. The slot of the present invention may be cast having a width of only 15 mils using state of the art technology. Such a slot may be used to partially intersect passages 42 to form inlets to such passages having cross-sectional areas smaller than the passages' minimum cross-sectional areas. The coolant fluid entering the passages then immediately begins to diffuse as it moves toward the passage outlets. A particular advantage of the present invention is the ability to form these metering areas without access to the interior of the airfoil. That is, the airfoil may be a one piece casting with the slot formed during the casting process. The passages 42 can then be machined into the wall from outside the airfoil to intersect with the slot 46 to form closely controlled metering areas of very small size.

Figure 8:
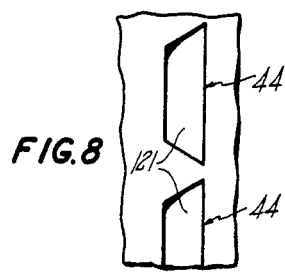
FIG. 8 is an enlarged view of the area designated 8—8 in FIG. 1.
Figure 10:
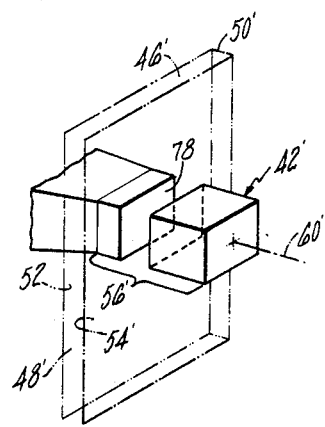
FIG. 10 is an illustrative perspective view of the area of intersection of component portions of the coolant passage according to another embodiment of the present invention.

An alternate configuration is shown in FIG. 10 wherein analogous elements are given the same, but primed, reference numerals as used in FIG. 8. In the configuration depicted by FIG. 10 the passage 42' intersects the slot side surface 52 fully between the slot inlet 48' and the slot base 50'. In this case the passage inlet, herein designated by the reference numeral 78, is simply the opening in the surface 52 formed by the intersection of the passage 42' with the surface 52'. Thus, the cross-sectional area of the straight section 56' is the metering area for the passage 42.

In operation, coolant fluid from the compartment 26 enters the slot 46 moving generally toward the slot base 50, which is toward the side surface 80 of the straight section 56. The sidewall 80 is, in this embodiment, an extension of the upstream side surface 68 of the diffusing section 58. There will be turbulence created by impingement of some of the coolant fluid against the surface 80; and also the fluid must change direction sharply to enter the straight section 56. The length of the section 56 from the slot surface 52 to the inlet 82 of the diffusing section 58 must be short relative to the effective diameter of the inlet area to the passage 42 in order to assure diffusing of the coolant fluid before the particles of fluid entering the section 56 lose their velocity components and momentum in a direction perpendicular to the central axis 60. In other words, if the diffusing section inlet 82 (i.e., the straight section outlet) is too far from the slot surface 52 the coolant fluid will have an opportunity to develop into a cohesive mass with its momentum and velocity substantially entirely in the direction of the central axis 60 toward the passage outlet. This will inhibit or prevent the fluid from filling the entire volume of the diffusing section 58 as it moves toward the outlet. The extent to which the diffusing section 58 does not fill will depend upon a number of factors, including the angle A, the length of the section 56 between the surface 52 and the diffusing section inlet 82, and the length of the diffusing section itself. It is our experience that the length of the straight section 56 from the slot surface 52, which is the slot surface nearest the inlet 82, to the diffusing section inlet 82 should be no greater than about 3.0 times the effective diameter of the metering area of the passage 42, preferably less than twice the diameter. The shorter the better, as long as the metering area is well defined.

Figure 7:
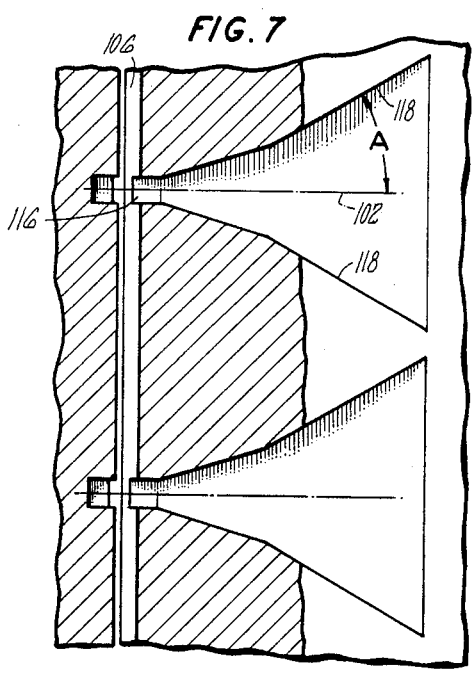
FIG. 7 is a cross-sectional view taken along the line 7—7 of FIG. 6.

The row of passages 44 of FIG. 1 represent an alternate embodiment of the present invention. As best shown in FIGS. 6-8, each passage 44 includes a straight section 100 having a constant cross-sectional area perpendicular to its central axis 102, and a diffusing section 104. A slot 106 extends longitudinally along the internal surface 22 of the wall 18 within the coolant compartment 26 and has a base 108 and side surfaces 110, 112 which are closely spaced apart and parallel to each other. The straight section 100 intersects the slot surface 110 between the base 108 and the slot inlet 114 whereby an inlet 116 to the passage 44 is formed in the slot surface 110 as illustrated in FIG. 10. Thus, in this embodiment, the metering area for the passage 44 is the cross-sectional area of the straight section 100 perpendicular to the central axis 102.

Another difference between the passages 44 and the passages 42 is that the diffusing section end surfaces 118, 120 each diverge from the central axis 102 in two steps to reach the final diffusion angle A. Also, the end surfaces 118 of adjacent passages do not intersect each other. Each surface 118 separately intersects the external surface 20 of the airfoil. Thus, each passage 44 has its own separate outlet 121 at the surface 20, as best shown in FIG. 8, which is an enlarged view of a portion of the external surface of the airfoil of FIG. 1. As with the passages 42, the central axis 102 of each passage extends in a generally downstream direction and forms a shallow angle C with the downstream direction 40 at the passage outlet. The side surface 120 of the passage 44 is parallel to the central axis 102 and is spaced from and faces the opposing side surface 122 (which is the downstream side surface), which surface diverges at an angle B of preferably no more than about 10° from the central axis 102 and from the upstream side surface 120.

Figure 11:
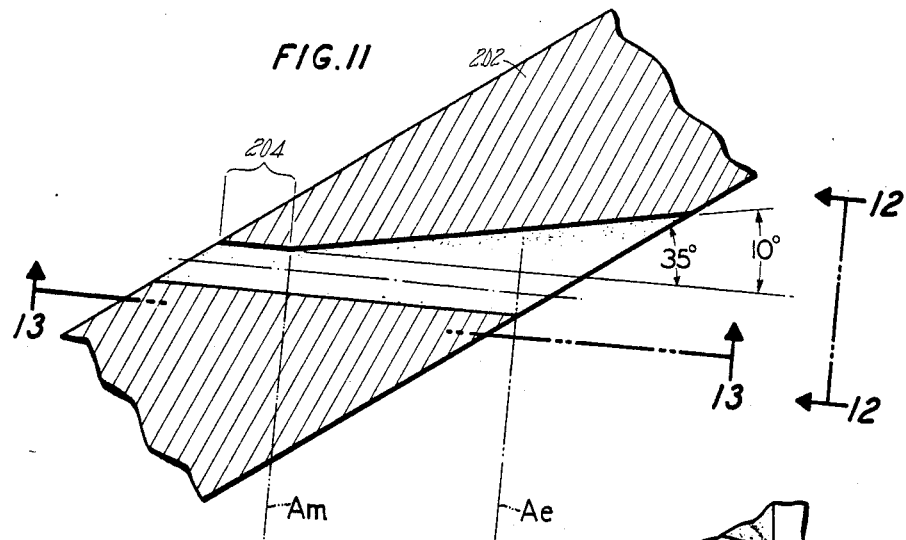
FIGS. 11-13 show the baseline coolant passage configuration against which comparisons of the present invention may be made.
Figure 12:
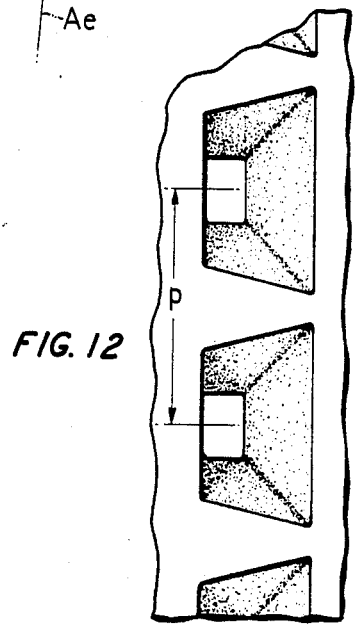
Figure 13:
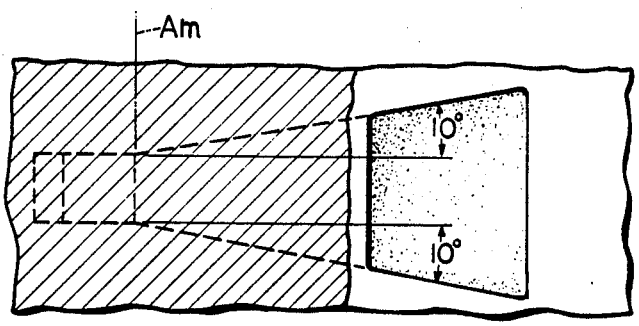

For purposes of comparison, coolant passages according to the present invention were tested against a row of shaped passages as shown in FIGS. 11-13 herein referred to as the "baseline" configuration. These shaped passages are similar to the shaped passages described in Sidenstick, U.S. Pat. No. 4,197,443, except the divergence angles are 10°. In the tests described below these passages flowed "full" and produced a coolant film of substantially the same width as the passage outlet despite the teaching of Sidenstick which suggests maximum divergence angles of 7°.

Figure 14:
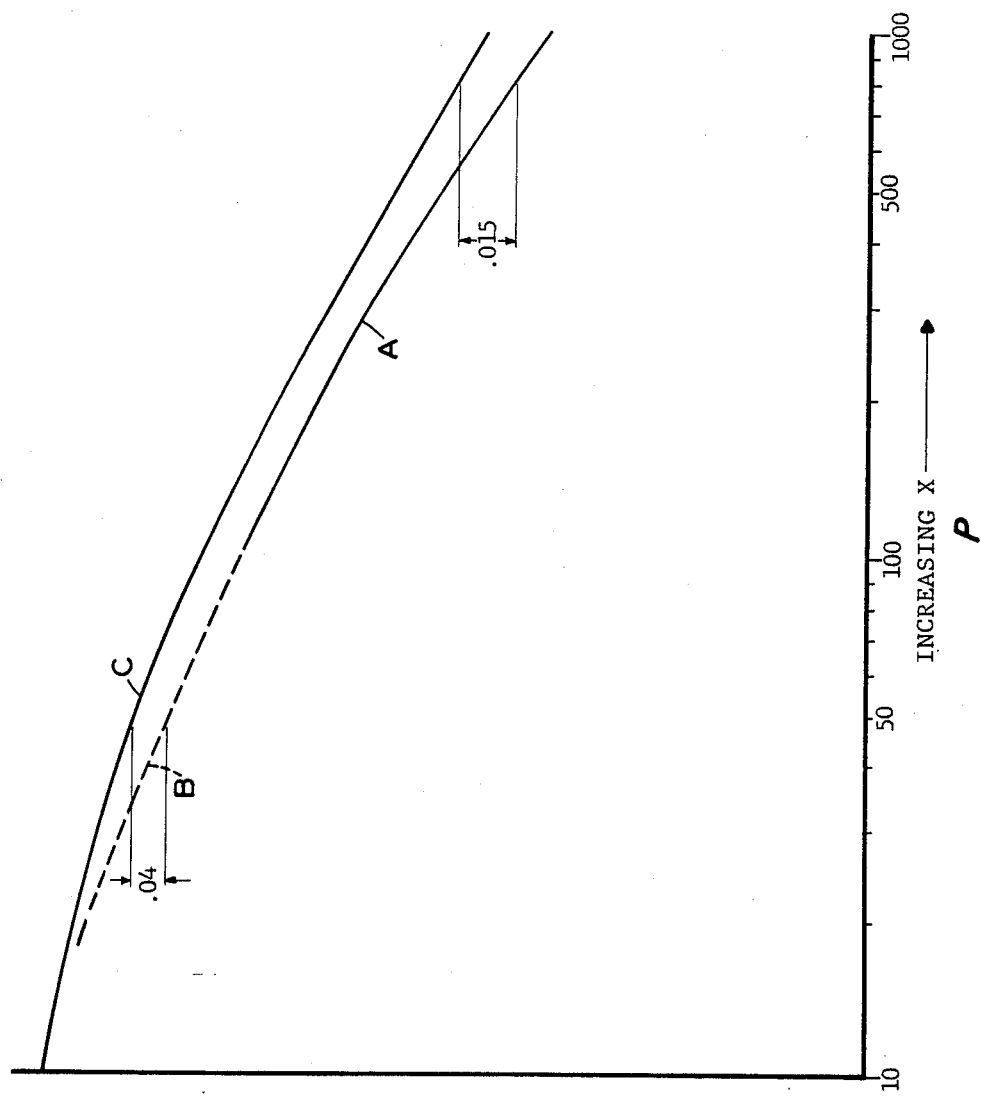
FIG. 14 is a graph which may be used to compare the film cooling effectiveness of a coolant passage configuration of the present invention to that of the baseline configuration of FIGS. 11-13.

The graph of FIG. 14 shows the test results. In FIG. 14 the horizontal axis is a dimensionless parameter P whose value is the ratio of the distance "x" from the outlet of the cooling passage (in the direction of the mainstream gas flow over the outlet —i.e., in the downstream direction) to a number directly related to the mass flow rate of cooling air exiting the passage. The vertical axis is a measure of the film cooling effectiveness E (as hereinabove defined) measured at the distance x downstream of the passage outlet. The maximum possible cooling effectiveness is 1.0. Because P is directly related to distance from the passage outlet, and since the distance downstream of the outlet is the only variable in these tests, P may be considered as a measure of distance downstream of the passage outlet.

The curve labeled A is for a row of baseline coolant passages 200 through a test plate 202 such as shown in FIGS. 11-13. The area ratio $A_e/A_m$ for each passage was 10.0, where $A_e$ is the cross-sectional area of the passage outlet measured in the plane labeled $A_e$ in FIG. 11, and where $A_m$ is the cross-sectional area of the metering section 204 (FIG. 11) as measured in the plane labeled $A_m$. The pitch to diameter ratio, p/d, was 6.57, wherein p (FIG. 12) is the distance between the centers of adjacent metering sections 200, and d is the effective diameter of the metering section, which is the diameter of a circle having the same cross-sectional area $A_m$. The curve labeled B is for a row of baseline coolant passages similar to FIGS. 11-13 but having a pitch to diameter p/d of 6.57 and an area ratio $A_e/A_m$ of 3.6.

The curve C is for a coolant configuration in a flat test plate similar to the coolant configuration formed by the passages 42 and slot 46 described with respect to FIGS. 1-5. Using the labels appearing in FIGS. 3 and 4, angle A was 28°, angle B was 10°, angle C was 45°, and angle D was 90°. The area ratio $A_e/A_m$ was 12.9 and the pitch to diameter ratio p/d was 5.77. $A_e$ was measured in the plane having that designation in FIG. 3, which plane is perpendicular to the passage central axis. $A_m$, at the intersection between the internal slot and the straight section of the passage, was estimated to be 0.0187 square inch. This compares to the cross-sectional area of the straight section of 0.0255 square inch. The test plate itself was about 17 inches long and 0.75 inches thick. The slot formed in the side of the test plate receiving the cooling fluid extended substantially the full length of the plate and was intersected by 18 coolant passages whose diverging end surfaces intersected the diverging end surfaces of adjacent passages just below the surface over which the hot gas was to flow, in the manner described with respect to FIGS. 3 and 4. Thus, the passages formed a longitudinally extending slot along the hot surface of the test plate, analogous to the slot 70 shown in FIG. 1.

The improvement in film cooling effectiveness, E, provided by the present invention is significant and can readily be seen in FIG. 13. For example, at P=50 the present invention has a cooling effectiveness 0.04 higher than that of the baseline shaped passages. At P=800 the difference in cooling effectiveness is 0.015. To put this in perspective, assuming a coolant temperature at the passage outlet of 1200° F. and a mainstream gas temperature of 2600° F., a 0.02 increase in cooling effectiveness translates into about a 28° F. decrease in the temperature of the coolant film for the same mass flow rate of coolant.

It should also be noted that, since the coolant fluid completely filled the longitudinally extending slot at the passage outlets in the hot surface of the test plate, the test configuration of the present invention provided a film of coolant which covered 100% of the longitudinal distance between the first and last passage. The configuration represented by curve A provides on the order of only 75% coverage, while the configuration of curve B provides on the order of about 54% coverage.

Although the invention has been shown and described with respect to a preferred embodiment thereof, it should be understood by those skilled in the art that other various changes and omissions in the form and detail of the invention may be made without departing from the spirit and scope thereof.

We claim:

1. A cooled wall having an outer surface adapted to be exposed to a hot gas stream flowing in a downstream direction over said outer surface, and an inner surface adapted to define a portion of a coolant compartment for receiving coolant therein under pressure, a slot formed in said inner surface of said wall, said slot comprising closely spaced apart first and second side surfaces and a base extending in a first direction substantially perpendicular to the downstream direction, said base located within said wall and interconnecting said side surfaces, said side surfaces intersecting said inner surface of said wall to define a narrow, elongated slot inlet opposite said base extending in said first direction for the full length of said slot and communicating with said coolant compartment for receiving coolant therein, a plurality of passages formed in said wall arranged in a row extending in said first direction, each passage having a base within said wall and including a diffusing section, each passage intersecting at least one of said slot side surfaces to define an inlet for said passage for receiving cooling fluid from said slot, said diffusing section of said passage having an outlet at said outer surface of said wall, said diffusing section including a pair of opposed end surfaces diverging from each other in said first direction to a maximum flow area at said outlet, said passage being oriented and adapted to direct coolant fluid from said outlet at a shallow angle to the outer surface of said wall with a component of velocity in the downstream direction.

2. The cooled wall according to claim 1 wherein said passage includes a straight, constant cross section metering section in series flow relation with said diffusing section, said metering section intersecting at least one of said slot side surfaces at a sharp angle and between said slot base and slot inlet, wherein the cross-sectional area of said metering section is the metering area for said passage.

3. The cooled wall according to claim 1 wherein said passage includes a constant cross-sectional area straight section in series flow relation with said diffusing section, said straight section intersecting at least one of said slot side surface and said slot base to define said inlet for said passage, said inlet having a cross-sectional area smaller than the cross-sectional area of said straight section, wherein said inlet defines the metering area for said passage.

4. The cooled wall according to claim 2 wherein said straight section has a central axis which intersects said one slot side surface at an angle of 90°, plus or minus 30°.

5. The cooled wall according to claim 4 wherein said passage includes a constant cross-sectional area straight section in series flow relation with said diffusing section, the length of said straight section from said slot side surface nearest said passage outlet to said diffusing section being no more than about three times the effective diameter of the metering area of said passage.

6. The cooled wall according to claim 1 wherein said wall is the external wall of a hollow airfoil and said first direction is the spanwise direction of said airfoil.

7. The cooled airfoil wall according to claim 6 wherein said passage includes a constant cross-sectional area straight section in series flow relation with said diffusing section, the length of said straight section from said slot side surface nearest said passage outlet to said diffusing section being no more than about two times the effective diameter of the metering area of said passage.

8. The cooled airfoil wall according to claim 7 wherein said straight section includes a central axis, which is the central axis of said passage, and said diffusing section includes an upstream side surface parallel to said central axis and a downstream side surface spaced apart from and facing said upstream side surface and diverging from said upstream side surface at an angle of up to 10°.

9. The cooled airfoil wall according to claim 7 wherein said diffusing section end surfaces diverge from each other by an included angle of at least 30°.

10. The cooled airfoil wall according to claim 7 wherein said end surfaces of adjacent passages intersect each other below or substantially at said outer surface of said wall, each diffusing section including a pair of spaced apart, facing side surfaces interconnecting said end surfaces of its respective passage and diverging from each other toward said passage outlet, said diffusing section side surfaces of said plurality of passages intersecting said outer surface to define a common elongated slot in said outer surface extending in said first direction.

11. The cooled wall according to claim 1 wherein said wall is the external wall of a cast, one piece hollow airfoil.

* * * * *